United States Patent
Kraemer (10) Patent No.: US 11,772,611 B2
(45) Date of Patent: Oct. 3, 2023

(54) WIPER DEVICE AND WINDSCREEN WIPER SYSTEM HAVING AT LEAST ONE WIPER DEVICE

(71) Applicant: Robert Bosch GmbH, Stuttgart (DE)

(72) Inventor: Godelieve Kraemer, Huegelsheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/636,924

(22) PCT Filed: Jun. 12, 2020

(86) PCT No.: PCT/EP2020/066286
§ 371 (c)(1),
(2) Date: Feb. 21, 2022

(87) PCT Pub. No.: WO2021/032336
PCT Pub. Date: Feb. 25, 2021

(65) Prior Publication Data
US 2022/0274565 A1    Sep. 1, 2022

(30) Foreign Application Priority Data
Aug. 22, 2019  (DE) ............ 10 2019 212 549.2

(51) Int. Cl.
*B60S 1/40*    (2006.01)
*B60S 1/38*    (2006.01)
*B60S 1/52*    (2006.01)

(52) U.S. Cl.
CPC .......... *B60S 1/4067* (2013.01); *B60S 1/3805* (2013.01); *B60S 1/524* (2013.01)

(58) Field of Classification Search
CPC .................... B60S 1/4067–2001/408
See application file for complete search history.

(56) References Cited

U.S. PATENT DOCUMENTS

2018/0326949 A1* 11/2018 Carrion ............ B60S 1/4038

FOREIGN PATENT DOCUMENTS

| DE | 102009043694 A1 | 4/2011 |
|----|-----------------|--------|
| EP | 3231673 A1 | 10/2017 |
| EP | 3674150 A1 | 7/2020 |
| WO | 2019120685 A1 | 6/2019 |

OTHER PUBLICATIONS

Translation of International Search Report for Application No. PCT/EP2020/066286 dated Sep. 11, 2020 (2 pages).

* cited by examiner

*Primary Examiner* — Andrew A Horton
(74) *Attorney, Agent, or Firm* — Michael Best & Friedrich LLP (57) ABSTRACT

The invention is based on a wiper device, in particular a windscreen wiper device, having a wiper arm adapter (10), having a wiper blade adapter (12) which can be coupled to the wiper arm adapter (10) along a pivot axis (14) of the wiper arm adapter (10), and having at least one electrical and/or fluidic transverse connection unit (16) which can be connected or can be disconnected by a pivoting movement of the wiper blade adapter (12) relative to the wiper arm adapter (10) about the pivot axis (14). It is proposed that the wiper device comprises at least one electrical and/or fluidic axial connection unit (18) which can be connected or can be disconnected by a translatory movement of the wiper blade adapter (12) relative to the wiper arm adapter (10), in particular along or parallel to the pivot axis (14).

15 Claims, 3 Drawing Sheets

WIPER DEVICE AND WINDSCREEN WIPER SYSTEM HAVING AT LEAST ONE WIPER DEVICE

BACKGROUND

A wiper device, in particular windshield wiper device, having a wiper arm adapter, having a wiper blade adapter which is couplable to the wiper arm adapter along a pivot axis of the wiper arm adapter, and having at least one electrical and/or fluidic transverse connection unit which is connectable or disconnectable by a pivoting movement of the wiper blade adapter relative to the wiper arm adapter about the pivot axis has already been proposed.

SUMMARY

The invention is based on a wiper device, in particular a windshield wiper device, having a wiper arm adapter, having a wiper blade adapter which is couplable to the wiper arm adapter along a pivot axis of the wiper arm adapter, and having at least one electrical and/or fluidic transverse connection unit which is connectable or disconnectable by a pivoting movement of the wiper blade adapter relative to the wiper arm adapter about the pivot axis.

It is proposed that the wiper device comprises at least one electrical and/or fluidic axial connection unit which is connectable or disconnectable by a translatory movement of the wiper blade adapter relative to the wiper arm adapter, in particular along or parallel to the pivot axis.

The electrical and/or fluidic axial connection unit preferably has at least two axial connection elements. In particular, the electrical and/or fluidic axial connection unit has at least one first axial connection element and at least one further axial connection element. The electrical and/or fluidic transverse connection unit preferably has at least two transverse connection elements. Furthermore, the electrical and/or fluidic transverse connection unit has at least one first transverse connection element and at least one further transverse connection element.

Furthermore, the wiper device has in particular an electrical line unit. The electrical line unit is preferably provided to conduct and/or transmit an electrical current and/or an electrical voltage from an electrical power source and/or an electrical voltage source to a consumer. The electrical line unit preferably has at least two cable elements. The line unit preferably has at least one first cable element and at least one further cable element. The at least one first cable element is arranged and/or guided on the wiper arm adapter and/or on a wiper arm. The at least one further cable element is arranged and/or guided on the wiper blade adapter and/or on a wiper blade. In particular, when the axial connection unit is configured as an electrical axial connection unit or the transverse connection unit is configured as an electrical transverse connection unit, the axial connection unit and/or the transverse connection unit has/have in each case at least two axial connection elements and/or transverse connection elements in the form of contact elements. The electrical axial connection unit and/or the electrical transverse connection unit preferably has at least one first contact element and at least one further contact element. The at least two contact elements are preferably provided to electrically connect the at least two cable elements. The at least one first contact element is particularly preferably coupled electrically to the at least one first cable element. The at least two contact elements are preferably at least largely designed as an electrical conductor. The at least two contact elements are preferably at least largely formed from metal. Alternatively, it is also conceivable to form the at least two contact elements at least largely from graphene, graphite and/or at least one semiconductor element. In particular, the at least two contact elements are provided for a releasable electrical connection. The at least two contact elements are preferably designed as at least one part of an electrical plug-in connection. In particular, the at least one first contact element is designed as a contact pin. The at least one further contact element is preferably designed as a contact bushing. In particular, the contact bushing is designed to receive the contact pin. The contact bushing is preferably provided to receive the contact pin in a clamped manner in a connected state. Alternatively, the at least one first contact element can be designed as a contact bushing and/or the at least one further contact element as a contact pin. Furthermore, the electrical axial connection unit and/or the electrical transverse connection unit is particularly preferably provided to electrically insulate the electrical connection in relation to an external environment. In particular, the electrical connection unit has at least one electrical insulating element.

Furthermore, the wiper device has in particular a fluidic line unit. The fluidic line unit is preferably provided to conduct a fluid, in particular wiping water, from a fluid container to a spray nozzle. The fluidic line unit preferably has at least two channel elements. In particular, the fluidic line unit has at least one first channel element and at least one further channel element. The at least one first channel element is arranged and/or guided on the wiper arm adapter and/or the wiper arm. The at least one further channel element is arranged and/or guided on the wiper blade adapter and/or the wiper blade. The at least two channel elements are preferably provided to transport and/or to conduct a fluid. The at least two channel elements are preferably in the form of pipes. In particular, when the axial connection unit is configured as a fluidic axial connection unit or the transverse connection unit is configured as a fluidic transverse connection unit, the axial connection unit and/or the transverse connection unit have/has in each case at least two connection elements, in particular axial connection elements and/or transverse connection elements, in the form of fluid connection elements. The fluidic axial connection unit or the fluidic transverse connection unit preferably has at least one first fluid connection element and at least one further fluid connection element. The fluidic axial connection unit or the fluidic transverse connection unit is preferably provided to fluidically connect the at least two channel elements to one another. At least one of the at least two fluid connection elements preferably has a fluidically conducting coupling to at least one of the at least two channel elements. In particular, the at least two fluid connection elements are provided for a releasable fluid connection. The at least two fluid connection elements are preferably designed at least as a part of a fluidic plug-in coupling. In particular, the at least one first fluid connection element is designed as a plug. The at least one further contact element is preferably designed as a socket. In particular, the socket is designed to receive the plug. The socket is preferably provided to receive the plug in a clamped manner in a connected state. Alternatively, the at least one first fluid connection element can be designed as a socket and/or the at least one further fluid connection element can be designed as a plug. Furthermore, the fluidic axial connection unit or the fluidic transverse connection unit is provided to fluidically seal the fluidically conducting connection in relation to an external environment. In particular, the fluidic axial connection unit or the fluidic transverse connection unit has at least one fluidic sealing element.

In particular, the axial connection unit is designed as an electrical axial connection unit and the transverse connection unit is designed as a fluidic transverse connection unit. Furthermore, it is preferably conceivable for the axial connection unit to be designed as a fluidic axial connection unit and the transverse connection unit to be designed as an electrical transverse connection unit. Furthermore, it is in particular conceivable for the transverse connection unit to be designed as an electrical transverse connection unit and the axial connection unit to be designed as an electrical axial connection unit. Furthermore, it is also conceivable in particular for the transverse connection unit to be designed as a fluidic transverse connection unit and the axial connection unit to be designed as a fluidic axial connection unit. Alternatively, it is in particular conceivable for the transverse connection unit to be designed as an electrical and fluidic transverse connection unit. In particular, it is furthermore alternatively conceivable for the axial connection unit to be designed as an electrical and fluidic axial connection unit.

The pivot axis preferably runs at least substantially perpendicular to a main axis of extent of the wiper arm adapter. The expression "substantially perpendicular" is intended here to define in particular an orientation of a direction relative to a reference direction, wherein the direction and the reference direction, in particular as observed in a plane of projection, enclose an angle of 90°, and the angle has a maximum deviation of in particular less than 8°, advantageously less than 5° and particularly advantageously less than 2°.

In particular, the at least two transverse connection elements of the electrical and/or fluidic transverse connection unit are provided to be connected to, disconnected from, coupled to and/or decoupled from one another in a direction transversely with respect to the pivot axis. The at least one first transverse connection element is preferably provided to be connected to, disconnected from, coupled to and/or decoupled from the at least one further transverse connection element in a direction at least substantially perpendicular to a main axis of extent of the wiper arm adapter and/or of the wiper arm. The at least two transverse connection elements are particularly preferably provided to be coupled and/or decoupled in a pivoting movement about the pivot axis. In particular, a coupling and/or decoupling of the at least two transverse connection elements is provided for connection and/or disconnection of an electrical and/or fluidic transverse connection. The at least two transverse connection elements are preferably provided in a mounted state to connect and/or to disconnect an electrical contact and/or a fluidic contact in a direction transversely with respect to the pivot axis.

Furthermore, the wiper arm adapter has at least one wiper arm adapter element. The at least one wiper arm adapter element is preferably designed to be at least substantially cylindrical. The at least one wiper arm adapter element is preferably designed as a bearing bolt. The wiper blade adapter element preferably has a main axis of extent which runs at least substantially concentrically with respect to the pivot axis. A "main axis of extent" of an object is intended to be understood as meaning in particular an axis which runs parallel to a longest edge of a smallest geometrical cuboid which only just completely surrounds the object. The main axis of extent preferably runs through a geometrical center point, along or at least substantially parallel to a geometrical center axis and/or a mass center of gravity of the object. The main axis of extent of the at least one wiper arm adapter element preferably forms the pivot axis. The main axis of extent of the wiper arm adapter element is preferably at least substantially perpendicular to a main axis of extent of the wiper arm adapter and/or of the wiper arm. In particular, the wiper blade adapter has at least one coupling region. The coupling region is preferably provided to receive and/or to support the at least one wiper arm adapter element. The coupling region preferably has a main axis of extent. The main axis of extent of the wiper arm adapter element is preferably provided in order, when the wiper arm adapter element is coupled to the coupling region of the wiper blade adapter, to be moved with the coupling region along the main axis of extent of the coupling region. Furthermore, the coupling region of the wiper blade adapter is provided in particular to pivotably mount the at least one wiper arm adapter element about the pivot axis.

In particular, the at least two axial connection elements of the electrical and/or fluidic axial connection unit are provided to be connected to, disconnected from, coupled to and/or decoupled from one another in a direction at least substantially parallel to the pivot axis. The at least one first axial connection element is preferably provided to be connected to, disconnected from, coupled to and/or decoupled from the at least one further axial connection element in a direction at least substantially perpendicular to the main axis of extent of the wiper arm adapter and/or of the wiper arm. The at least two axial connection elements are particularly preferably provided to be coupled and/or decoupled in a pivoting movement about the pivot axis. In particular, a coupling and/or decoupling of the at least two axial connection elements for connection and/or disconnection of an electrical and/or fluidic axial connection is provided. The at least two axial connection elements are preferably provided in a mounted state to connect and/or to disconnect an electrical contact and/or a fluidic contact in a direction at least substantially parallel to the pivot axis. The at least one first axial connection element is preferably arranged on the at least one wiper arm adapter element. The at least one further axial connection element is particularly preferably arranged on the coupling region. Alternatively, a reverse arrangement is also conceivable.

By means of the configuration according to the invention, operational safety can be maintained and/or a defect-induced risk of failure kept small. A spatial separation between an electrical and a fluidic connection can be achieved. A risk of fluid being transmitted from the fluidic connection to the electrical connection can advantageously be kept small. Furthermore, in a particularly advantageous manner, a number of installation steps can be kept low. An installation period can advantageously be kept small. Furthermore, a particularly simple and/or rapid installation can advantageously be provided. Furthermore, a particularly advantageously space-saving wiper device can be provided. In addition, an air resistance can advantageously be kept small.

Furthermore, it is proposed that the at least one transverse connection unit has a transverse connection axis which extends transversely with respect to an axial connection axis of the at least one axial connection unit. The transverse connection axis or the axial connection axis is preferably at least substantially parallel to a direction which is provided in each case for connecting and/or disconnecting at least two transverse connection elements of the transverse connection unit or at least two axial connection elements of the axial connection unit. In particular, the at least two transverse connection elements or at least two axial connection elements are in each case provided to produce and/or to disconnect an electrical and/or fluidic connection along and/or parallel to the transverse connection axis and/or the axial connection axis. The transverse connection axis or the axial connection axis is preferably in each case at least substantially parallel to the transverse connection unit or the axial connection unit. The at least one first axial connection element or the at least one first transverse connection element is particularly preferably provided in each case to be coupled to the at least one further axial connection element or to the at least one further transverse connection element along and/or parallel to the transverse connection axis or the axial connection axis. The axial connection axis is preferably at least substantially parallel to the pivot axis. The transverse connection axis is preferably at least substantially perpendicular to the main axis of extent of the wiper arm adapter. The main axis of extent of the wiper arm adapter particularly preferably extends transverse to the pivot axis. By means of the configuration according to the invention of the wiper device, the transverse connection unit can advantageously be separated and/or connected independently of the axial connection unit. A disconnection and/or connection of an electrical connection and a separation and/or connection of a fluidic connection can advantageously be carried out advantageously operationally reliably spaced apart spatially and/or in time from each other and/or separately. In the event of a defect in an insulation and/or seal of one of the electrical and/or fluidic connections, failure and/or damage of a further electrical and/or fluidic connection can be very substantially prevented. Furthermore, installation steps can advantageously be combined. A coupling and/or decoupling of the wiper arm adapter to or from the wiper blade adapter can advantageously be combined with a connection and/or disconnection of an electrical and/or fluidic connection. Rapid installation can advantageously be provided.

Furthermore, it is proposed that the at least one axial connection unit has at least two axial connection elements, in particular the at least two previously mentioned axial connection elements, which, in a connected state, are mounted pivotably to one another. In particular, the at least two axial connection elements are mounted pivotably about the pivot axis. The axial connection unit is preferably designed as a joint. In particular, the axial connection unit is at least partially designed as a ball joint, ellipsoid joint, condyloid joint, cylinder joint and/or pivot joint. The joint is particularly provided to be coupled and/or decoupled at least substantially parallel to the pivot axis. In particular, coupling and/or decoupling of the joint is provided for connection and/or disconnection of an electrical and/or fluidic axial connection. A bearing axis of the axial connection unit preferably runs at least substantially parallel to the pivot axis. The at least two axial connection elements are preferably coupled releasably to one another in a connected state. A releasable coupling is preferably disconnectable without destruction. In particular, the joint is couplable releasably. The releasable coupling is preferably provided in a coupled state to prevent a movement of the at least two axial connection elements relative to one another along the axial connection axis. In particular, coupling and/or decoupling of the axial connection unit, which is at least partially designed as a joint, is provided for disconnecting and/or for connecting the electrical and/or fluidic axial connection.

By means of the configuration according to the invention of the wiper device, electrical and/or fluidic connections can advantageously be arranged on movable components of the wiper device. Stresses and/or forces acting from the outside can be advantageously absorbed, dissipated and/or compensated for. A long service life and great reliability and/or operational safety can be advantageously maintained. Wear and/or failure probability can advantageously be kept small. Furthermore, a connection can be advantageously combined with components of the wiper device. A construction space can particularly advantageously be kept small.

It is furthermore provided that the axial connection unit has at least two axial connection elements, in particular the previously mentioned axial connection elements, which, in a connected state, in particular the previously mentioned connected state of the axial connection unit, have an electrically and/or a fluidically conductive connection irrespective of the pivoting movement of the wiper blade adapter relative to the wiper arm adapter about the pivot axis. The wiper blade adapter and the wiper arm adapter preferably have a preferably restricted maximum pivoting region about the common pivot axis. The at least two contact elements and/or fluid connection elements of the axial connection unit are preferably mounted so as to be pivotable relative to one another about the pivot axis in the connected state. The at least two contact elements and/or fluid connection elements of the axial connection unit are particularly preferably mounted pivotably along a pivoting region, in particular in an electrically and/or fluidically conducting state. The pivoting region of the axial connection unit preferably corresponds at least to the maximum pivoting region of the wiper arm adapter and of the wiper blade adapter. In the connected state, the at least two contact elements and/or fluid connection elements of the axial connection unit are preferably provided to have the electrically and/or fluidically conducting contact without interruption during the pivoting movement at least over the maximum pivoting region of the wiper arm adapter and of the wiper blade adapter. The at least two contact elements and/or the at least two fluid connection elements of the axial connection unit preferably have the electrically and/or fluidically conducting contact irrespective of a relative pivoting position within the maximum pivoting region with respect to one another. By means of the configuration according to the invention of the wiper device, an electrical and/or fluidic contact can advantageously be maintained reliably and/or irrespective of a relative movement of the wiper arm adapter to the wiper blade adapter in a connected state. It is particularly advantageously possible to achieve a disconnection and/or connection of the axial connection unit and the transverse connection unit spaced apart spatially and/or in time from one another. Particularly advantageously, a failure risk of a connection due to a defect of another connection can advantageously be kept small. Great operational reliability can advantageously be maintained. Furthermore, safe installation with low health risks for a fitter can advantageously be provided. An installation sequence which advantageously has little in terms of installation errors can be specified.

It is furthermore proposed that the at least one axial connection unit has at least one sliding contact element. In particular, the at least one first contact element at least partially forms the at least one sliding contact element. The at least one further contact element of the axial connection unit is preferably at least partially designed as a current-conducting conductor. The at least one further contact element is particularly preferably arranged on at least one part of an end side and/or one part of a circumferential surface of the at least one axial connection element. The at least one further contact element, in particular in a mounted and connected state, preferably has an electrical contact with the at least one further axial connection element, preferably along the pivoting region of the axial connection unit. In particular, the electrical axial connection unit has at least one spring element. A "spring element" is intended to be understood as meaning in particular a macroscopic element which has at least an extent which, in a normal operating state, is elastically changeable by at least 10%, in particular by at least 20%, preferably by at least 30% and particularly advantageously by at least 50%, and which produces in particular a counterforce which is dependent on a change in the extent and is preferably proportional to the change and which counteracts the change. An "extent" of an element is intended to be understood as meaning in particular a maximum distance between two points of a perpendicular projection of the element onto a plane. A "macroscopic element" is intended to be understood as meaning in particular an element with an extent of at least 1 mm, in particular of at least 3 mm and preferably of at least 5 mm. In the connected state of the axial connection unit, the at least one spring element is preferably provided to exert a contact force on and/or via the at least one sliding contact. In the connected state of the axial connection unit, the spring element is preferably provided for the at least one sliding contact element to make contact with the at least one further contact element, in particular by means of the contact force. The at least one sliding contact element is preferably formed integrally with the spring element. "Integrally" is intended to be understood as meaning in particular connected at least in an integrally bonded manner, for example by a welding process, an adhesive bonding process, a molding process and/or another process appearing expedient to a person skilled in the art, and/or advantageously formed in one piece, for example by production from a casting and/or by production in a single- or multi-component injection-molding method and advantageously from an individual blank. In particular, the sliding contact element is designed as a sliding plate, a sliding bar and/or a sliding pin. Alternatively, it is conceivable for the sliding contact element to be designed as a brush. The at least one further contact element is preferably designed as a contact plate, conductor track, conductor section and/or conduction groove. By means of the configuration according to the invention, a construction space of the axial connection unit can advantageously be kept small. An electrically conducting connection can advantageously be placed at an unused construction space region. Installation errors can advantageously be avoided and/or an outlay on installation can advantageously be kept small. Furthermore, an electrically conducting connection which is advantageously operationally safe and/or is independent of a pivoting movement, in particular of the wiper arm adapter with respect to the wiper blade adapter, can be provided.

Furthermore, it is proposed that the at least one axial connection unit and/or the at least one transverse connection unit has at least two induction elements for a wireless electrical connection. In particular, the wiper device has an electronic unit. The electronic unit has in particular at least one transformer element. The transformer element is preferably provided to output an alternating voltage and/or an alternating current. The at least two induction elements are preferably provided to in particular wirelessly transmit electrical energy from the at least one first cable element to the at least one further cable element. In the connected state of the axial connection unit, at least two induction elements are particularly preferably each electrically connected to at least one of the at least two cable elements. The at least two induction elements are preferably at least largely formed from metal. Alternatively, it is also conceivable to form the at least two induction elements at least largely from graphene, graphite and/or at least one semiconductor element. The at least two induction elements are particularly preferably at least largely surrounded by an electrically insulating material. At least one first induction element of the at least two induction elements preferably has an electrical connection to the at least one transformer element of the electronic unit. In particular, the at least one first induction element is provided to emit electromagnetic radiation. The at least one first induction element is particularly preferably designed as a coil. The at least one first induction element is preferably provided to generate an electromagnetic alternating field. Furthermore, in particular at least one further induction element of the at least two induction elements is provided to receive the electromagnetic radiation emitted by the at least one induction element. The at least one further induction element is preferably designed as a coil. In the connected state of the axial connection unit, the at least two induction elements are particularly preferably coupled electromagnetically to one another. By means of the configuration according to the invention of the wiper device, an advantageously high degree of use of a construction space can be achieved. The induction elements can advantageously be integrated in existing structural elements without taking up additional construction space. Mechanical wear of electrical components can be advantageously very substantially avoided. Furthermore, open electrical contacts can be advantageously avoided. Electrical contacts can be particularly advantageously electrically and/or fluidically insulated and/or sealed.

Furthermore, it is proposed that the at least one axial connection unit has at least one ball and socket joint unit. In particular, the at least one ball and socket joint unit has at least two ball and socket joint elements. The at least one ball and socket joint unit preferably has at least one first ball and socket joint element and at least one further ball and socket joint element. The at least one first ball and socket joint element is preferably designed as a joint socket. The at least one further ball and socket joint element is preferably designed as a joint head. In particular, the at least one first ball and socket joint element is provided to at least for the most part surround a largest circumference of the at least one further ball and socket joint element. The expression "at least for the most part" is intended to be understood here as meaning in particular at least 55%, advantageously at least 65%, preferably at least 75%, particularly preferably at least 85% and particularly advantageously at least 95% of a closed section, in particular an entire circumference, a closed surface and/or a closed volume. In particular, the at least one first ball and socket joint element engages at least partially around at least one equatorial plane of the at least one further ball and socket joint element. The at least one first ball and socket joint element preferably engages at least partially around at least one region above and below the equatorial plane on a surface of the at least one further ball and socket joint element. The at least one first ball and socket joint element is preferably formed in one part with the at least one first axial connection element. The at least one further ball and socket joint element is preferably formed in one part with the at least one further axial connection element. The at least one contact element, the at least one sliding contact element, the at least one induction element and/or the at least one fluid connection element is particularly preferably formed in one part with the at least one ball and socket joint element. Furthermore, the at least one further contact element, the at least one further induction element and/or the at least one further fluid connection element is particularly preferably formed in one part with the at least one further ball and socket joint element. By means of the configuration according to the invention of the wiper device, an advantageously simple electrical and/or fluidic connection can be provided. A pivotable fluidic axial connection unit can be particularly advantageously provided, preferably in a sealed connected state. An advantageously simple mountability can be provided. Installation steps can advantageously be combined. An electrical and/or fluidic connection can advantageously be provided simultaneously in a common installation step with a first and/or second coupling step of the wiper arm adapter to the wiper blade adapter. Installation errors can advantageously be kept small and/or installation work can be facilitated.

It is furthermore proposed that the axial connection unit has at least two axial connection elements, in particular the axial connection elements already mentioned previously, and at least one coupling element which is provided to hold one of the at least two axial connection elements relative to a further of the at least two axial connection elements counter to a translatory movement, running at least substantially parallel to the pivot axis, in particular independently of the pivoting movement. The at least one first axial connection element is preferably arranged on the wiper arm adapter. The at least one coupling element is preferably arranged on the wiper arm adapter. In particular, the at least one coupling element is designed as a magnet, as a clamping element and/or a latching element. The latching element and/or the clamping element is preferably designed as an extension and/or an elevation. The latching element and/or the clamping element is preferably designed as a bolt, a bridge, as a lug, as a hook and/or as a latching profile and/or clamping profile. The latching profile and/or clamping profile particularly preferably has a circular, ellipsoidal and/or polygonal surface contour. The at least one further axial connection element and/or the wiper blade adapter particularly preferably has a mating coupling region. In particular, the mating coupling region is formed from metal and/or iron and/or has a latching element receiving region and/or a clamping element receiving region. The mating coupling region is preferably formed in a manner correlated to the shape of a contour of the magnet, the clamping element and/or the latching element. In a state coupled to the coupling element, the mating coupling region is particularly preferably provided to guide the magnet, the clamping element and/or the latching element in a direction transversely with respect to the pivot axis. The coupling element is particularly preferably designed as a magnet. The at least one coupling element is preferably arranged on the at least one wiper arm adapter element of the wiper arm adapter. Furthermore, in particular the at least one further axial connection element and/or the wiper blade adapter have a magnetic and/or magnetizable mating coupling region. The at least one further axial connection element is preferably arranged on the wiper blade adapter. The at least one further axial connection element is preferably formed integrally with the mating coupling region. The magnetic and/or magnetizable mating coupling region preferably extends at least over a maximum pivoting region of the at least one coupling element about the common pivot axis. The metallic mating coupling region is provided in particular to hold the one of the at least two axial connection elements counter to a translatory movement, running at least substantially parallel to the pivot axis, relative to the at least one further axial connection element, in particular independently of the pivoting movement. Alternatively, it is conceivable for the at least one coupling element to be at least partially designed as the joint head and/or the joint socket of the ball and socket joint. By means of the configuration according to the invention of the wiper device, a disconnection of the axial connection unit during a connection of the transverse connection unit in the direction transversely with respect to the pivot axis can advantageously be very substantially prevented. Wear and/or premature abrasion of components of the axial connection unit, the wiper blade adapter and/or the wiper arm adapter can advantageously be kept small and/or very substantially prevented. Installation steps can be advantageously simply identified and/or carried out by the fitter, preferably because of a forced position of the wiper blade adapter with respect to the wiper arm adapter. Furthermore, erroneous installation sequences can be advantageously kept small. Furthermore, the coupling element can be advantageously integrated in existing components without taking up additional construction space. A high degree of construction space efficiency can advantageously be achieved.

It is furthermore proposed that the axial connection unit has at least one axial connection element which is arranged on a pivot bearing element defining the pivot axis, in particular a bearing bolt, preferably the previously mentioned bearing bolt, of the wiper arm adapter, wherein the transverse connection unit has at least one transverse connection element, in particular the previously mentioned at least one first transverse connection element, which is arranged on the wiper arm adapter outside an immediate vicinity of the pivot axis in a direction transversely with respect to the pivot axis. The at least one wiper arm adapter element preferably at least largely forms the pivot bearing element. In particular, the at least one first axial connection element is arranged on the at least one wiper arm adapter element. The at least one further axial connection element is preferably arranged on the coupling region of the wiper blade adapter.

The immediate vicinity of the pivot axis is preferably a region with a maximum extent about the pivot axis, which region has in particular at least 30%, preferably at least 40%, preferentially at least 50% and particularly preferably at least 60% of a maximum longitudinal extent, preferably at least substantially parallel to the main axis of extent, of the wiper blade adapter. The maximum extent preferably has a value from a range of values from in particular 4 mm to 30 mm, preferably from 8 mm to 25 mm, preferably from 12 mm to 20 mm and particularly preferably from 15 mm to 18 mm. By means of the configuration according to the invention of the wiper device, a combination of components of the wiper device can advantageously be achieved. A construction space can advantageously be kept small. Furthermore, installation steps can advantageously be combined. A connection and/or disconnection of the axial connection unit and/or of the transverse connection unit for an electrical and/or fluidic connection can advantageously be combined in one installation step with installation steps for coupling and/or decoupling the wiper arm adapter to/from the wiper blade adapter. An installation period can advantageously be kept small. Furthermore, an outlay on installation can advantageously be reduced.

In addition, a wiper blade adapter, in particular the previously mentioned wiper blade adapter having a wiper device according to the invention is proposed. In particular, the wiper blade adapter is provided to receive the wiper blade. The wiper blade adapter is provided in particular to couple the wiper blade to the wiper arm. The wiper blade adapter is preferably provided to guide and/or to receive at least one section of at least one of the at least two channel elements. The wiper blade adapter is preferably provided to guide and/or to receive at least one section of at least one of the at least two cable elements. By means of the configuration according to the invention of the wiper blade adapter, the transverse connection unit and the axial connection unit can advantageously be placed spatially separated from each other. An advantageously high degree of operational safety and/or reliability of the configuration according to the invention can be achieved. At least one axial connection element and/or at least one transverse connection element can advantageously be combined with an existing component of the wiper blade adapter. A construction space can be particularly advantageously kept small.

Furthermore, in addition, a wiper arm adapter, in particular the previously mentioned wiper arm adapter, having a wiper device according to the invention is proposed. In particular, the wiper arm adapter is provided to receive the wiper blade via the wiper blade adapter. The wiper arm adapter is provided in particular to couple the wiper blade to the wiper arm via the wiper blade adapter. The wiper arm adapter is preferably provided to guide and/or receive at least one section of at least one of the at least two channel elements. The wiper arm adapter is preferably provided to guide and/or to receive at least one section of at least one of the at least two cable elements. By means of the configuration according to the invention of the wiper arm adapter, the transverse connection unit and the axial connection unit can advantageously be placed spatially separately from each other. An advantageously high degree of operational safety and/or reliability of the configuration according to the invention can be achieved. At least one axial connection element and/or at least one transverse connection element can advantageously be combined with an existing component of the wiper blade adapter. A construction space can be particularly advantageously kept small.

In addition, a windshield wiper system having at least one wiper arm, in particular the previously mentioned wiper arm, having at least one wiper blade, in particular the previously mentioned wiper blade, and having the wiper device according to the invention is proposed. The wiper arm preferably has the wiper arm adapter. The wiper blade preferably has the wiper blade adapter. The windshield wiper system is preferably provided to be mounted on a vehicle. The windshield wiper system is preferably provided to clean and/or to wash a wiping surface on a vehicle window. In particular, the windshield wiper system has a spray device for wetting the wiping surface with wiping water. Furthermore, the windshield wiper system has a wiping water channel unit. The wiping water channel unit is provided to supply wiping water to the spray device. The windshield wiper system preferably has a fluid container for storing the wiping water. Furthermore, the windshield wiper system preferably has at least one pump unit. The pump unit is preferably provided to convey wiping water out of the fluid container and to supply the wiping water to the wiping water channel unit. The spray unit is preferably fluidically connected to the pump unit and to the fluid container by means of the fluidic transverse connection unit and/or axial connection unit, the channel unit and the wiping water channel unit. Furthermore, the windshield wiper system has in particular at least one heating unit. The heating unit is preferably provided to prevent freezing of the wiping water in the wiping water channel unit. The heating unit is preferably operated electrically. The heating unit is preferably connected to an electrical energy source by means of the electrical transverse connection unit and/or axial connection unit and the electrical line unit. By means of the configuration according to the invention of the windshield wiper system, an advantageously simple and/or operationally safe installation can be achieved. An electrical connection can advantageously be separated spatially and/or in time from a fluidic connection. Wear and/or premature aging of the components of the axial connection unit, the transverse connection unit, the wiper arm adapter and/or the wiper blade adapter can be particularly advantageously kept small. Risks of a combination of electrical and fluidic connections can be particularly advantageously circumvented and/or kept small. Furthermore, a diversity of parts and/or a number of installation steps can be advantageously kept small. Furthermore, a risk of erroneous installation can be advantageously kept small. By means of a combination of components for installation and/or removal and for a connection and/or disconnection of a connection, an advantageously small construction space can be achieved. A wind resistance can advantageously be kept small.

The wiper device according to the invention and/or the windshield wiper system according to the invention are not intended to be limited here to the above-described use and embodiment. In particular, the wiper device according to the invention and/or the windshield wiper system according to the invention, in order to perform a function described herein, may have a number of individual elements, components and units which differs from the number mentioned herein. In addition, in the ranges of values indicated in this disclosure, values lying within the limits mentioned are also intended to be considered to be disclosed and usable as desired.

BRIEF DESCRIPTION OF THE DRAWINGS

Further advantages emerge from the description below of the drawings. The drawings illustrate two exemplary embodiments of the invention. The drawings, the description and the claims contain numerous features in combination. A person skilled in the art will expediently also consider the features individually and combine them to form meaningful further combinations.

In the drawings.

DETAILED DESCRIPTION

Figure 1:
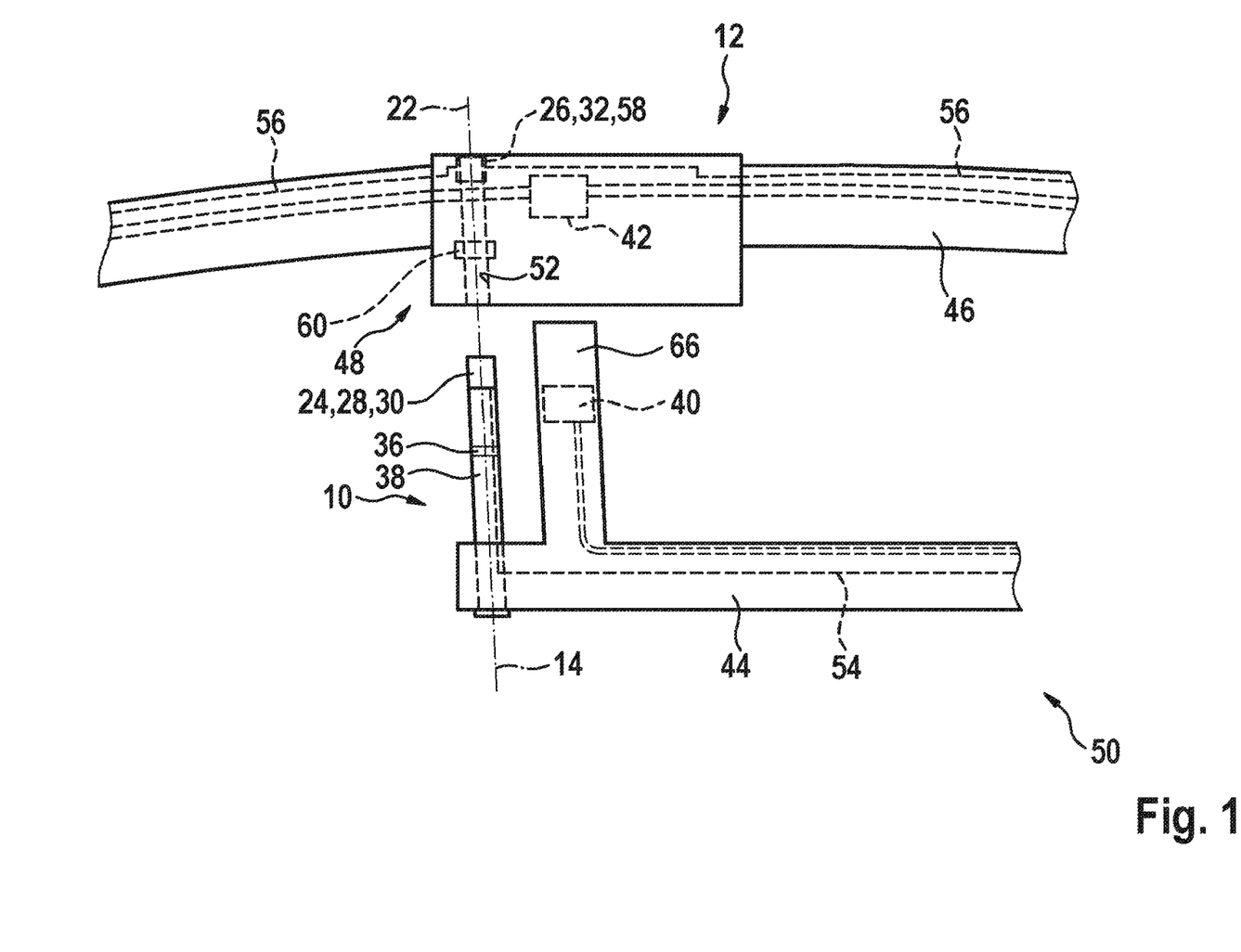
FIG. 1 shows a windshield wiper system according to the invention having a wiper device according to the invention in a separated state of the wiper blade adapter and the wiper arm adapter in a schematic illustration.

FIG. 1 shows a windshield wiper system 50 having a wiper arm 44, having a wiper blade 46 and having a wiper device 48. The wiper arm 44 has a wiper arm adapter 10. The wiper blade 46 has a wiper blade adapter 12. The wiper arm adapter 10 has a pivoting bearing element 38. The pivoting bearing element 38 is formed in one part with a wiper arm adapter element. The pivoting bearing element 38 is designed as a bearing bolt. The pivoting bearing element 38 has a main axis of extent which runs substantially perpendicular to a main axis of extent of the wiper arm 44. The wiper arm 44 and/or the wiper arm adapter 10 are couplable to the wiper blade 46 and/or to the wiper blade adapter 12 by means of a side-lock connection. The wiper blade adapter 12 has a bearing opening 52 for receiving the bearing bolt. For coupling the wiper arm adapter 10 to the wiper blade adapter 12, the main plane of extent of the wiper arm 44 runs transversely with respect to a main plane of extent of the wiper blade 46. Furthermore, the pivoting bearing element 38 for a coupling is provided to be received in the bearing opening in a translatory movement along a main axis of extent of the bearing opening 52.

Figure 2:
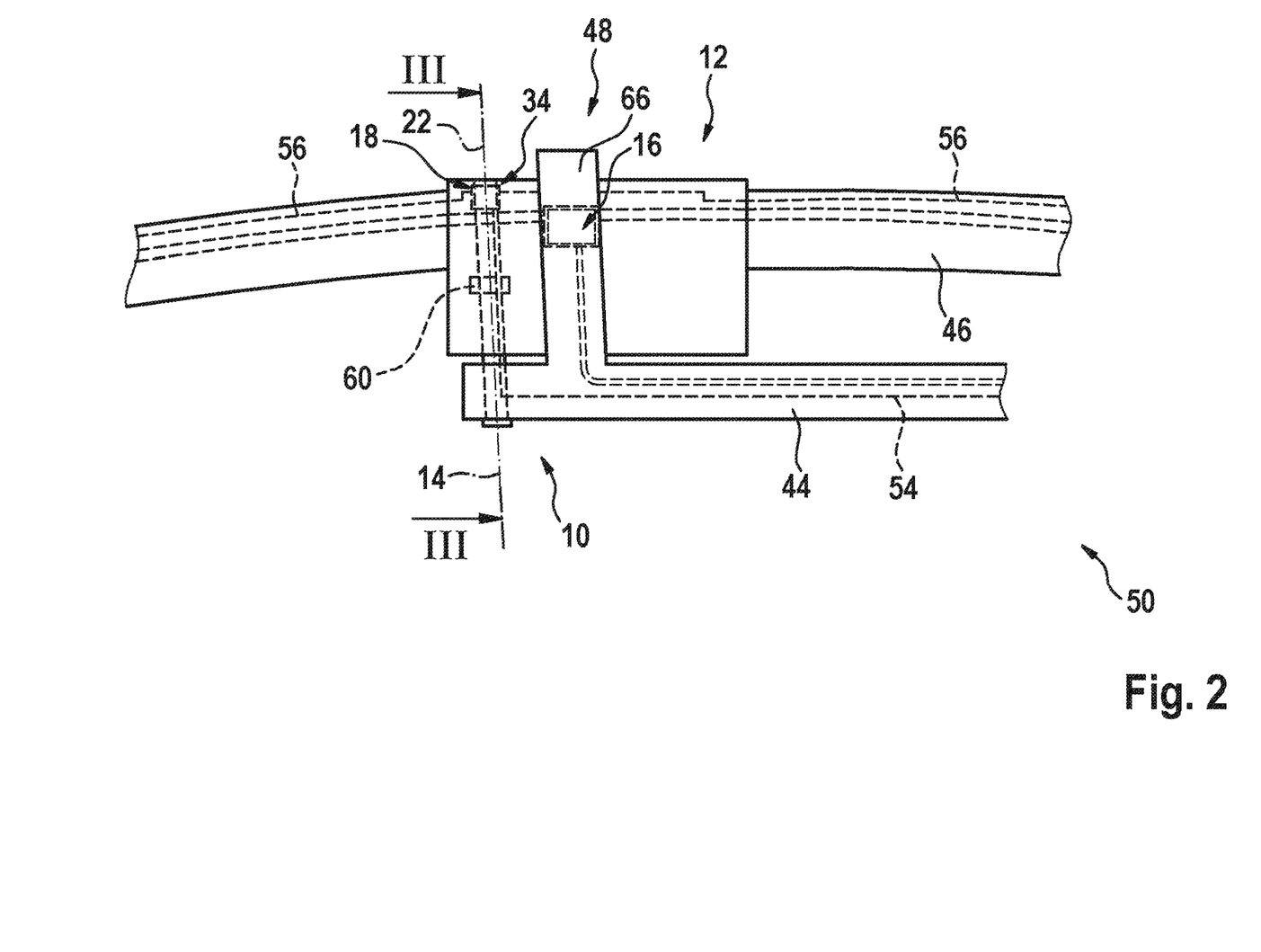
FIG. 2 shows the windshield wiper system according to the invention having the wiper device according to the invention in a coupled state of the wiper blade adapter and the wiper arm adapter in a schematic illustration.

FIG. 2 shows a coupled state of the wiper arm adapter 10 to the wiper blade adapter 12. In the coupled state of the wiper arm adapter 10 to the wiper blade adapter 12, the pivoting bearing element 38 is received pivotably in the bearing opening 52. A main axis of extent of the pivoting bearing element 38 defines a pivot axis 14. In the coupled state, the wiper arm adapter 10 and/or the wiper arm 44 with the wiper blade adapter 12 and/or the wiper blade 46 is mounted pivotably about the pivot axis 14. Furthermore, the wiper arm adapter 10 has a safety clip 66. The safety clip 66 is provided to partially engage around the wiper blade adapter 12 on three sides in a secured coupled state. In the secured coupled state, the main axis of extent of the wiper blade 46 and/or of the wiper blade adapter 12 runs substantially parallel to the main axis of extent of the wiper arm 44 and/or of the wiper arm adapter 10. The safety clip 66 arranged on the wiper arm adapter 10 is provided to be pivoted from the coupled state about the pivot axis 14 into the secured coupled state. In the secured coupled state, the safety clip 66 is provided to limit a translatory movement of the wiper arm adapter 10 relative to the wiper blade adapter 12 in a form-fitting manner.

The wiper device 48 has the wiper arm adapter 10 and the wiper blade adapter 12. Furthermore, the wiper device 48 has an electrical line unit. The electrical line unit has two cable elements 54, 56. The electrical line unit has a first cable element 54 and a second cable element 56. The two cable elements are provided to supply an electrical consumer, not illustrated specifically, with electrical energy. The first cable element 54 is arranged on the wiper arm 44 and/or the wiper arm adapter 10. The second cable element 56 is arranged on the wiper blade 46 and/or the wiper blade adapter 12. The wiper device 48 furthermore has at least one electrical axial connection unit 18 which is connectable or disconnectable by the translatory movement of the wiper blade adapter 12 relative to the wiper arm adapter 10 along the pivot axis 14. The axial connection unit 18 has two axial connection elements 24, 26 which, in a connected state, have an electrically conducting connection irrespective of the pivoting movement of the wiper blade adapter 12 relative to the wiper arm adapter 10 about the pivot axis 14. The axial connection unit 18 has a first axial connection element 24 and a second axial connection element 26. The first axial connection element 24 is arranged on the pivoting bearing element 38. The second axial connection element 24 is arranged on the bearing opening 52. Furthermore, the axial connection unit 18 has an axial connection axis 22. The two axial connection elements 24, 26 are provided to be connected or disconnected along the axial connection axis 22. A translatory movement of the first axial connection element 24 relative to the second axial connection element 26 along the axial connection axis 22 is provided to connect or to disconnect the two axial connection elements 24, 26. The axial connection axis 22 runs substantially parallel to the pivot axis 14. A coupling of the pivoting bearing element 38 of the wiper arm adapter 10 to the bearing opening 52 bounded by the wiper blade adapter 12 is provided to electrically connect the first axial connection element 24 and the second axial connection element 26. Furthermore, the axial connection unit 18 has two contact elements. In a connected state of the axial connection unit 18, the two contact elements are provided to connect the two cable elements 54, 56 electrically to each other. The axial connection unit 18 has a first contact element and a second contact element. The first contact element is received on the first axial connection element 24. In the connected state of the axial connection unit 18, the two axial connection elements 24, 26 are mounted pivotably with respect to each other. Furthermore, the first contact element is designed as a sliding contact element 28. The second contact element is received on the second axial connection element 26. Furthermore, the second contact element is designed as a contact plate 58. In the connected state, the axial connection unit 18 with the two axial connection elements 24, 26 has an electrically conducting connection irrespective of the pivoting movement of the wiper blade adapter 12 relative to the wiper arm adapter 10 about the pivot axis 14. In the connected state of the axial connection unit 18, the sliding contact element 28 is provided to be in electrical contact with the second contact element irrespective of the pivoting movement of the first axial connection element 24 relative to the second axial connection element 26. Furthermore, in the connected state of the axial connection unit 18, the sliding contact element 28 is provided to electrically connect the two cable elements 54, 56 irrespective of the pivoting movement of the first axial connection element 24 relative to the second axial connection element 26. The sliding contact element 28 is provided to exert a contact force on the second contact element. The sliding contact element 28 is designed as a spring contact element.

Figure 3:
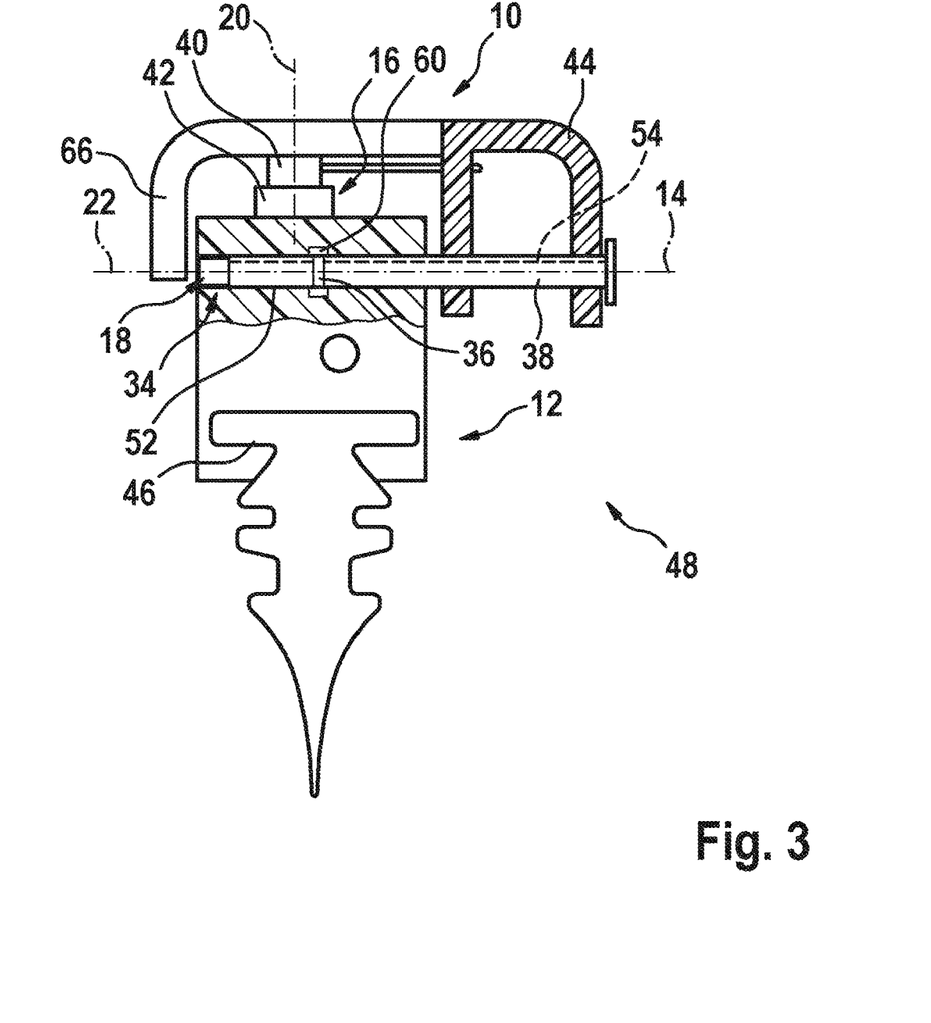
FIG. 3 shows the wiper device according to the invention in a partial sectional illustration (III-III) in a region about the pivot axis in a coupled state of the wiper blade adapter with the wiper arm adapter to a connected axial connection unit and to a connected transverse connection unit of the wiper device in a schematic illustration.

Furthermore, the axial connection unit 18 with the two axial connection elements 24, 26 has a coupling element 36. The coupling element 36 is provided to hold the first axial connection element 24 counter to the translatory movement, running at least substantially parallel to the pivot axis 14, relative to the second axial connection element 26 irrespective of the pivoting movement. The coupling element 36 is designed as a permanent magnet. The axial connection unit 18 furthermore has a mating coupling region 60. The mating coupling region is arranged on the second axial connection element 26. In the connected state, the permanent magnet is provided to exert a magnetic holding force on the mating coupling region 60. The mating coupling region 60 is formed by a ferromagnetic material. In the connected state of the axial connection unit 18, the magnetic holding force is provided to counteract at least the contact force of the sliding contact element 28 on the second contact element. Furthermore, the coupling element 36 and the mating coupling region 60 have at least the holding force over a maximum pivoting region of the wiper arm adapter 10 and of the wiper blade adapter 12 about the pivot axis 14. Furthermore, the wiper device 48 has a fluidic transverse connection unit 16. The fluidic transverse connection unit 16 is provided to be connected or disconnected by the pivoting movement of the wiper blade adapter 12 relative to the wiper arm adapter 10 about the pivot axis 14. The fluidic transverse connection 16 is provided to be connected in the pivoting movement from the coupled state into the secured coupled state. The transverse connection unit 16 has two transverse connection elements 40, 42. The transverse connection unit 16 has a first transverse connection element 40 and a second transverse connection element 42. Furthermore, the transverse connection unit is designed as a ball and socket joint. The first transverse connection element 40 is designed as a ball and socket joint head. The second transverse connection element 42 is designed as a ball and socket joint socket. The wiper device furthermore has a wiping water channel unit. The wiping water channel unit has a first channel element and a second channel element. The first channel element is partially arranged on the ball and socket joint head. The second channel element is partially arranged on the ball and socket joint socket. In a connected state of the transverse connection unit 16, the two channel elements are fluidically connected to each other. The transverse connection unit 16 is provided to be connected along a transverse connection axis 20. FIG. 3 shows that, in a connected state of the transverse connection unit 16, the transverse connection axis 20 runs perpendicular to the pivot axis 14. Furthermore, in the connected state of the transverse connection unit 16, the transverse connection axis 20 runs transversely with respect to the axial connection axis 22 of the axial connection unit 18. In the connected state of the transverse connection unit 16, the transverse connection axis 20 runs substantially perpendicular to the axial connection axis 22 of the axial connection unit 18.

Furthermore, the first transverse connection element 40 is arranged on the wiper blade adapter 12 outside an immediate vicinity of the pivot axis 14 in a direction transversely with respect to the pivot axis 14. The second transverse connection element 42 is arranged on the wiper arm adapter 10 outside an immediate vicinity of the pivot axis 14 in a further direction transversely with respect to the pivot axis 14. A maximum distance of the immediate vicinity from the pivot axis 14 lies in a range of values from 10 mm to 20 mm. The first transverse connection element 40 is arranged on a lower side of the safety clip 66, the lower side facing the wiper blade adapter 12. The second transverse connection element 42 is arranged on a surface of the wiper blade adapter 12 around which the safety clip 66 engages.

Alternatively, it is proposed that the at least one axial connection unit 18 has at least one ball and socket joint unit 34. The ball and socket joint unit 34 has a first ball and socket joint element, not illustrated specifically, and a second ball and socket joint element, not illustrated specifically. The first ball and socket joint element is designed as a ball and socket joint head. The second ball and socket joint element is designed as a ball and socket joint socket. In this case, the first axial connection element 24 would be formed in one part with the first ball and socket joint element. Furthermore, the second axial connection element 26 would be formed in one part with the second ball and socket joint element. Furthermore, alternatively, the ball and socket joint socket and the ball and socket joint head can be assigned to the respective other element. Furthermore, it is conceivable for the transverse connection unit 16 to be at least partially formed by a further ball and socket joint unit. In this case, the first transverse connection element 40 would be formed in one part with a first ball and socket joint element designed as a ball and socket joint head. Furthermore, the second transverse connection element 42 would be formed in one part with the second ball and socket joint element designed as a ball and socket joint socket.

Furthermore, it is conceivable for the first ball and socket joint element to be formed in one part with the coupling element 36. Furthermore, the second ball and socket joint element would be formed here as a mating coupling region 60. The ball and socket joint unit 34 is provided here to hold the first axial connection element 24 counter to the translatory movement, running at least substantially parallel to the pivot axis 14, relative to the second axial connection element 26 irrespective of the pivoting movement. Furthermore, it is conceivable for the sliding contact element 28 to be arranged on the first ball and socket joint element. The second contact element would be arranged here on the second ball and socket joint element.

Furthermore, it would alternatively be conceivable for the at least one axial connection unit 18 to have two induction elements 30, 32 for a wireless electrical connection, instead of and/or in addition to the sliding contact element 28. The two induction elements 30, 32 are designed as an electrical coil. The two induction elements 30, 32 are provided to wirelessly transmit electrical energy. Furthermore, the two induction elements 30, 32 are provided to wirelessly transmit the electrical energy from the first cable element 54 to the second cable element 56. The first induction element 30 is designed as a transmitter. The first induction element 30 is provided to generate an electromagnetic alternating field. The first induction element 30 is arranged on the first axial connection element 24. The second induction element 32 is designed as a receiver. The second induction element 32 is provided to remove energy from the electromagnetic alternating field and to convert it into electrical energy. The second induction element 32 is arranged on the second axial connection element 26.

In addition, it would be conceivable for the axial connection unit to be designed as a fluidic axial connection unit and/or for the transverse connection unit to be designed as an electrical transverse connection unit.

What is claimed is:

1. A wiper device comprising a wiper arm adapter (10) and a wiper blade adapter (12) which is couplable to the wiper arm adapter (10) along a pivot axis (14) of the wiper arm adapter (10), the wiper device also comprising at least one electrical and/or fluidic transverse connection unit (16) which is connectable or disconnectable by a pivoting movement of the wiper blade adapter (12) relative to the wiper arm adapter (10) about the pivot axis (14), and at least one electrical and/or fluidic axial connection unit (18) which is connectable or disconnectable by a translatory movement of the wiper blade adapter (12) relative to the wiper arm adapter (10).

2. The wiper device as claimed in claim 1, wherein the at least one transverse connection unit (16) has a transverse connection axis (20) which extends transversely with respect to an axial connection axis (22) of the at least one axial connection unit (18).

3. The wiper device as claimed in claim 1, wherein the at least one axial connection unit (18) has at least two axial connection elements (24, 26) which, in a connected state, are mounted pivotably with respect to one another.

4. The wiper device as claimed in claim 1, wherein the axial connection unit (18) has at least two axial connection elements (24, 26) which, in a connected state, have an electrically and/or a fluidically conducting contact irrespective of the pivoting movement of the wiper blade adapter (12) relative to the wiper arm adapter (10) about the pivot axis (14).

5. The wiper device as claimed in claim 1, wherein the at least one axial connection unit (18) has at least one sliding contact element (28).

6. The wiper device as claimed in claim 1, wherein the at least one axial connection unit (18) and/or the transverse connection unit (16) has at least two induction elements (30, 32) for a wireless electrical connection.

7. The wiper device as claimed in claim 1, wherein the at least one axial connection unit (18) has at least one ball and socket joint unit (34).

8. The wiper device as claimed in claim 1, wherein the axial connection unit (18) has at least two axial connection elements (24, 26) and at least one coupling element (36) which is provided to hold one of the at least two axial connection elements (24, 26) counter to a translatory movement, running at least substantially parallel to the pivot axis (14), relative to another of the at least two axial connection elements (24, 26).

9. The wiper device as claimed in claim 8, wherein the at least one coupling element (36) is provided to hold one of the at least two axial connection elements (24, 26) counter to a translatory movement, running at least substantially parallel to the pivot axis (14), relative to another of the at least two axial connection elements (24, 26), independently of pivoting movement.

10. The wiper device as claimed in claim 1, wherein the axial connection unit (18) has at least one axial connection element (24) which is arranged on a pivot bearing element (38) defining the pivot axis (14), of the wiper arm adapter (10), wherein the transverse connection unit (16) has at least one transverse connection element (40, 42) which is arranged on the wiper arm adapter (10) outside an immediate vicinity of the pivot axis (14) in a direction transversely with respect to the pivot axis (14).

11. The wiper device as claimed in claim 10, wherein the pivot bearing element (38) is a bearing bolt of the wiper arm adapter (10).

12. A wiper blade adapter (12) of the wiper device (48) as claimed in claim 1.

13. A wiper arm adapter (10) of the wiper device (48) as claimed in claim 1.

14. A windshield wiper system at least one wiper arm (44), at least one wiper blade (46) and at least one wiper device (48) as claimed in claim 1.

15. The wiper device as claimed in claim 1, wherein the translatory movement of the wiper blade adapter (12) relative to the wiper arm adapter (10 is along or parallel to the pivot axis (14).

\* \* \* \* \*